United States Patent [19]

Oishi et al.

[11] Patent Number: 4,634,259
[45] Date of Patent: Jan. 6, 1987

[54] APPARATUS FOR MAINTAINING DISTINCT EDGES BETWEEN TWO COLORS IN A TWO-COLOR IMAGE FORMING DEVICE

[75] Inventors: Mitsugu Oishi; Hidefumi Kanai, both of Tokyo, Japan

[73] Assignees: Casio Computer Co., Ltd.; Casio Electronics Manufacturing Co., Ltd., both of Tokyo, Japan

[21] Appl. No.: 680,772

[22] Filed: Dec. 11, 1984

[30] Foreign Application Priority Data

| Dec. 13, 1983 | [JP] | Japan | 58-233677 |
| Feb. 29, 1984 | [JP] | Japan | 59-37728 |
| Mar. 22, 1984 | [JP] | Japan | 59-54947 |
| Apr. 29, 1984 | [JP] | Japan | 59-87307 |
| Apr. 30, 1984 | [JP] | Japan | 59-87365 |
| May 22, 1984 | [JP] | Japan | 59-103394 |

[51] Int. Cl.⁴ .......................................... G03G 15/01
[52] U.S. Cl. ................................ 355/4; 355/3 CH; 430/42; 430/902
[58] Field of Search ................ 355/4, 3 CH; 430/42, 430/902; 361/229; 250/324–326

[56] References Cited

U.S. PATENT DOCUMENTS

| 3,370,212 | 2/1968 | Frank | 361/229 |
| 4,398,817 | 8/1983 | Nishimura et al. | 355/4 |
| 4,539,281 | 9/1985 | Tanaka et al. | 430/42 X |

FOREIGN PATENT DOCUMENTS

| 56-146154 | 11/1981 | Japan | 355/4 |
| 58-78157 | 5/1983 | Japan | 355/4 |

Primary Examiner—Arthur T. Grimley
Assistant Examiner—J. Pendegrass
Attorney, Agent, or Firm—Sandler & Greenblum

[57] ABSTRACT

Two-color image forming apparatus has a bipolar photosensitive body, a first charging means, a first electrostatic latent image forming means, a first developing means, a second charging means, a second electrostatic latent image forming means, and a second developing means. The second charging means is a corona discharger having a corona ion stream control screen forming by laminating a conductive member with an insulating member and disposed at or near an open portion for radiating a corona ion.

38 Claims, 23 Drawing Figures (a)

(b)

(c)

F I G. 14
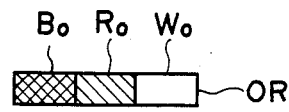
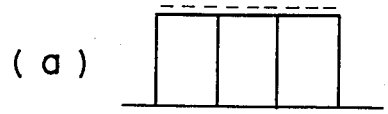
(a)
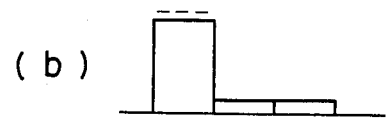
(b)
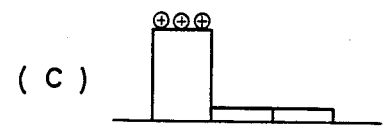
(c)
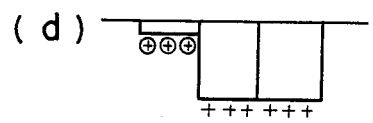
(d)
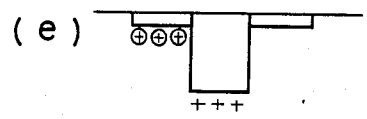
(e)
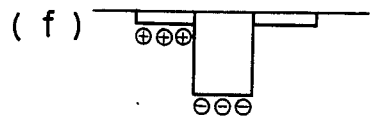
(f)

F I G. 15
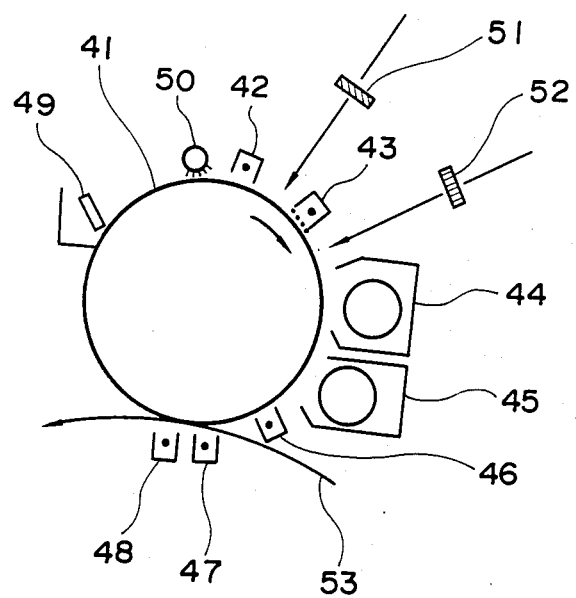

(a)

(b)

(c)

(d)

(a)

(b)

(c)

(d)

(a)
B R W (b)

(c)

(d)

(e)

(f)

F I G. 21
F I G. 20
(a) 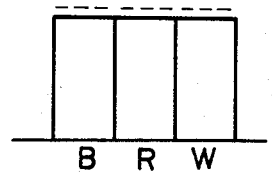
B R W
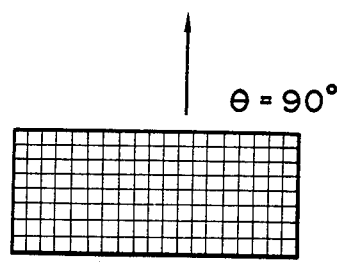
θ=90°
(b) 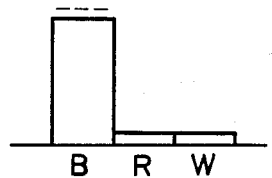
B R W
F I G. 22
(c) 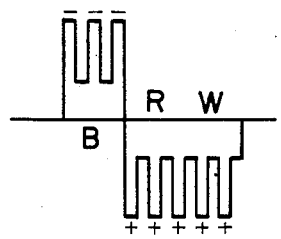
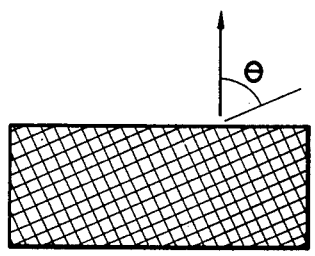
θ
(d) 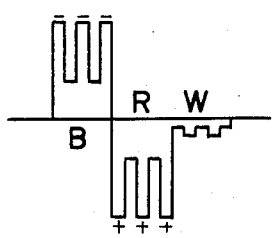

APPARATUS FOR MAINTAINING DISTINCT EDGES BETWEEN TWO COLORS IN A TWO-COLOR IMAGE FORMING DEVICE

BACKGROUND OF THE INVENTION

1. Field of the Invention

The present invention relates to an image forming apparatus such as the electrophotographic copying machine and printer which use the electrophotographic engineering and, more particularly, it relates to a two-color image forming apparatus provided with a bipolar photosensitive body.

2. Prior Art and Its Problems

It was conventionally common that the two-color image forming apparatus in which the bipolar photosensitive body was incorporated used a corona discharge unit shown in FIG. 1 to achieve primary charge and secondary charge, which is reverse in polarity to the primary charge.

The corona discharge unit comprises a corona wire 1 and a conductive shield 2 and serves to apply high voltage to the corona wire 1 to ionize the circumjacent atmosphere. This gas thus ionized advances to the opposite pole, that is, a grounded photosensitive body 3 according to polarity to charge the surface of the photosensitive body 3. However, corona ion flow emitted from the corona discharge unit is radial as shown in FIG. 1 and its speed is insufficient. When a secondary charge of reverse polarity is applied, using the corona discharge unit, onto the photosensitive body 3 which has a first image of a predetermined polarity, therefore, corona ions of reverse polarity concentrate onto edge and fine line portions of the first image which are large in potential contrast, and the amount of charge at these portions reaches the bias level of second development, thereby causing first and second image toners to be mixed at the time of the second development.

FIG. 2 shows a model of the process attained when the corona discharge unit shown in FIG. 1 is used as a secondary charge unit for the two-color image copying apparatus.

Step (i) represents a step by which primary charge of a predetermined polarity is applied onto a bipolar photosensitive body P. First light exposure is applied to an original OR (or image of two colors A and B on white C) through a filter, which shields the color A but allows the color B to pass through, at a step (ii) to form a first electrostatic latent image. Step (iii) represents a first developing step by which a toner (a) of the color A is stuck to those portions which have not been exposed at the time of the first light exposure, to thereby form a first image. A step (iv) represents secondary charge which is reverse in polarity to the first charge. Since corona ions at the time of the secondary charge concentrate onto the edge portion of the first image which is large in potential contrast, as described above, even potential at those portions where the color-A toner (a) has been stuck is inverted to positive polarity which corresponds to the polarity of the secondary charge, and it reaches bias level at the time of second development in which a toner (b) of the color B is used. As the result, the color-B toner (b) mounts on those portions which have been developed with the color-A toner (a) to thereby cause mixture of colors, when second development is carried out using the color-B toner (b) after second light exposure is done using the filter which shields at least the color B, as shown by a step (v). This is outstanding at the fine line and edge portions of the first image.

In order to solve this problem, it is supposed that a corona discharge unit shown in FIG. 3 is used as the secondary charge unit.

The corona discharge unit comprises a corona wire 1, conductive shield 2, and insulating slit member 4. The slit member 4 is arranged at the opening of the conductive shield 2 to allow corona ions to be emitted only through the slit thereof.

This corona discharge unit improves the straightly-advancing capacity of corona ion flow to some extent, but the angle of emitting the so-called corona ions is only made narrower. In the case where the corona discharge unit is used at the secondary charge of reverse polarity by means of the two-color image forming apparatus such as the two-color image copying machine in which the bipolar photosensitive body is incorporated, therefore, mixture of colors which is caused at the edge and fine line portions of the first image at the time of developing the second electrostatic latent image cannot be prevented completely.

In the case of the corona discharge unit shown in FIG. 3, corona ions which contribute to charging are only those which are emitted through the slit of the slit member 4, thereby leaving charging effect insufficient.

SUMMARY OF THE INVENTION

The present invention is therefore intended to eliminate the above-mentioned drawbacks and the object of the present invention is to provide a two-color image forming apparatus having a corona discharge unit provided with a corona ion flow control screen arranged at or near its corona ion emitting opening and capable of forming stable two-color images without causing mixture of colors in relation to first and second images.

The object of the present invention can be achieved by a two-color image forming apparatus comprising a movable bipolar photosensitive body, first charging means for applying a predetermined polarity charge to said photosensitive body, first electrostatic latent image forming means arranged downstream of the first charging means along the moving direction of the photosensitive body for forming first electrostatic latent image by exposing the surface of said photosensitive body which is charged by said first charging means, first developing means provided downstream of the exposing portion in the first electrostatic latent image forming means along the moving direction of the photosensitive body for developing said first electrostatic latent image, second charging means comprising a corona discharger having a corona ion stream control screen formed by laminating a conducting member with an insulating member and disposed at or near an open portion for radiating a corona ion for applying a charge opposite in polarity to the charge applied by the first charging means to the photosensitive body, second electrostatic latent image forming means for forming a second electrostatic latent image by exposing the surface of the photosensitive body charged by the second charging means at downstream side of the second charging means in the moving direction of the photosensitive body and second developing means provided downstream of the exposing portion in the second electrostatic latent image forming means along the moving direction of the photosensitive body.

BRIEF DESCRIPTION OF THE DRAWINGS

FIG. 14 shows how the surface potential of a photosensitive body is changed at the time of forming an image.

FIG. 15 shows another example of the two-color image copying apparatus according to the present invention.

FIG. 20 is a plan showing a screen member.

FIG. 21 is a change chart showing the surface potential of the photosensitive body.

FIG. 22 is a plan showing another screen member.

PREFERRED EMBODIMENTS OF THE INVENTION

Figure 1:
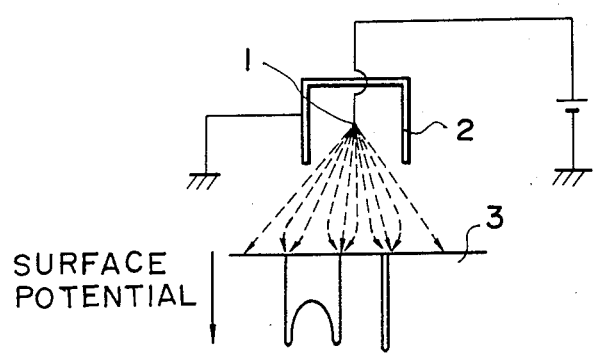
FIG. 1 shows an arrangement of the conventional corona discharge unit for achieving secondary charge.
Figure 2:
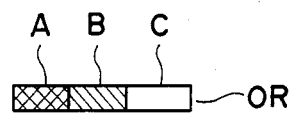
FIG. 2 is a model of a process which shows steps of forming a two-color image, using the conventional corona discharge unit.
Figure 2:
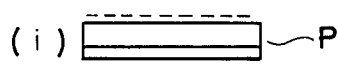
Figure 2:
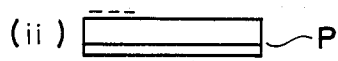
Figure 2:
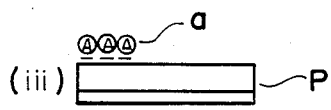
Figure 2:
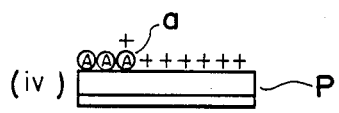
Figure 2:
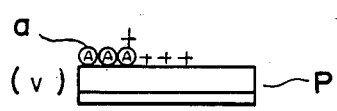
Figure 3:
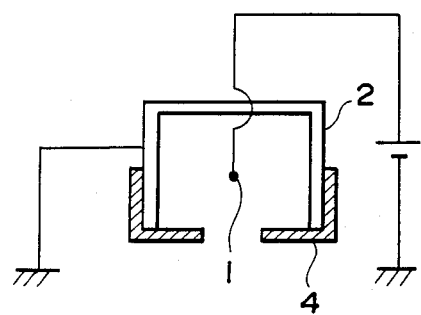
FIG. 3 shows another arrangement of the conventional corona discharge unit.
Figure 4:
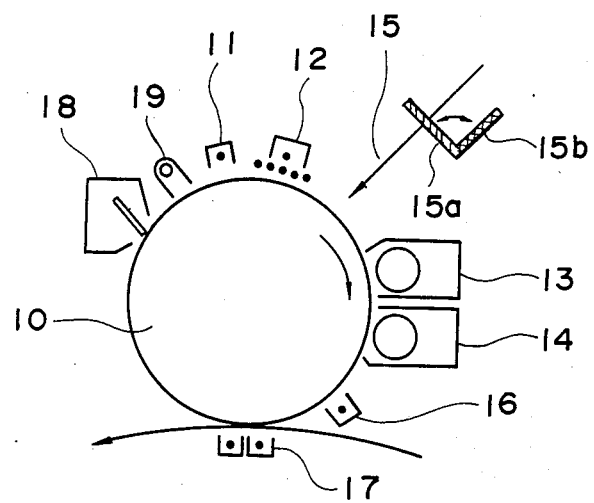
FIG. 4 shows an example of the two-color image forming apparatus according to the present invention.

FIG. 4 shows an example of the two-color image forming apparatus according to the present invention. This two-color image forming apparatus serves as the copying machine and comprises a photosensitive body 10 rotatable in a direction shown by an arrow and its circumjacent units, which include primary and secondary charge units 11 and 12, first and second developing units 13 and 14, an exposing section 15, red and cyanic filters 15a and 15b, a polarity-matching unit 16, transfer unit 17, cleaner 18, eraser lamp 19 and the like.

Figure 5:
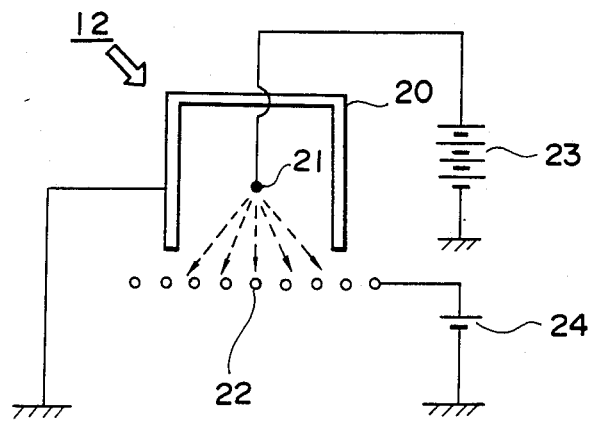
FIG. 5 shows the arrangement of a secondary charge unit employed.

FIG. 5 shows an example of the secondary charge unit 12 employed by the present invention.

The secondary charge unit 12 comprises a conductive shield member 20, corona wire 21, corona ion flow control screen 22, corona generating power source 23 and screen biasing power source 24.

The opening of the shield member 20 is 20-30 mm wide, and the corona wire 21 is a tungsten wire or gold-plated tungsten wire having a diameter of 50-80 μm. Predetermined voltage is applied from the corona generating power source 23 to the corona wire 21.

As shown in FIG. 5, the corona ion flow control screen 22 is arranged at or near the opening of the shield member 20 and connected to the screen biasing power source 24.

Figure 6:
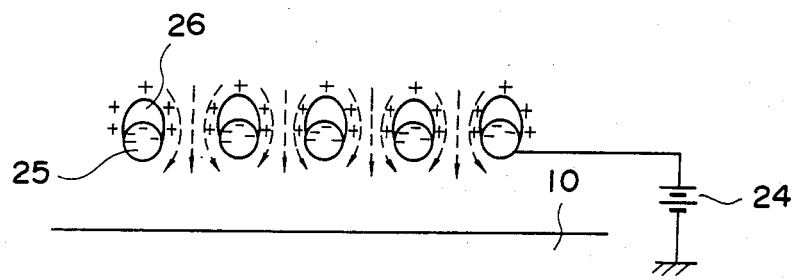
FIG. 6 shows a state of the secondary charge unit controlled.
Figure 7:
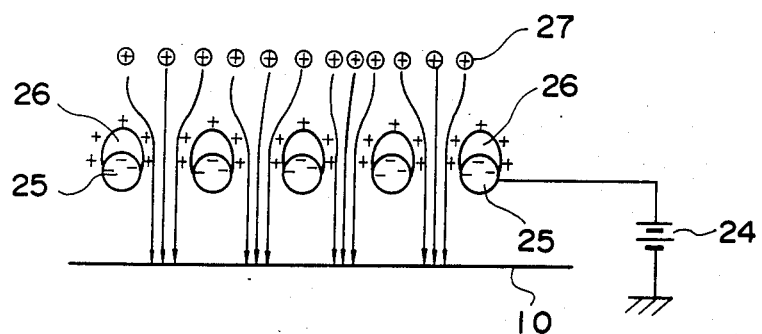
FIG. 7 shows a state of acting corona ions.

The corona ion flow control screen 22 comprises a plurality of conductors 25 extending parallel to the corona wire 21 and insulators 26 each covering that side of each of the conductors 25 which is directed to the corona wire 21, and the conductors 25 are connected to the screen biasing power source 24, as shown in FIG. 6.

When voltage of 5-6 KV, for example, is applied from the corona generating power source 23 to the corona wire 21, that side of the corona ion control screen 22 which is directed to the corona wire 21, that is, the surface of each of the insulators 26 is charged positive by corona ions thus generated.

Since the conductors 25 of the corona ion flow control screen 22 are grounded through the screen biasing power source 24, electric flux lines which are shown by arrows of broken lines in FIG. 6 are now generated between the conductors of the corona ion flow control screen 22. Corona ions 27 are thus accelerated along the electric flux lines, advancing toward the photosensitive body 10 at high speed and in a direction normal to the photosensitive body 10. Therefore, the corona ions 27 are allowed to advance straight without depending upon the surface potential of the photosensitive body 10 caused by a first electrostatic latent image which has been formed on the photosensitive body 10, and the whole of the image can be thus uniformly shifted positive, keeping the potential unchanged, the potential being formed by the first electrostatic latent image.

Figure 8:
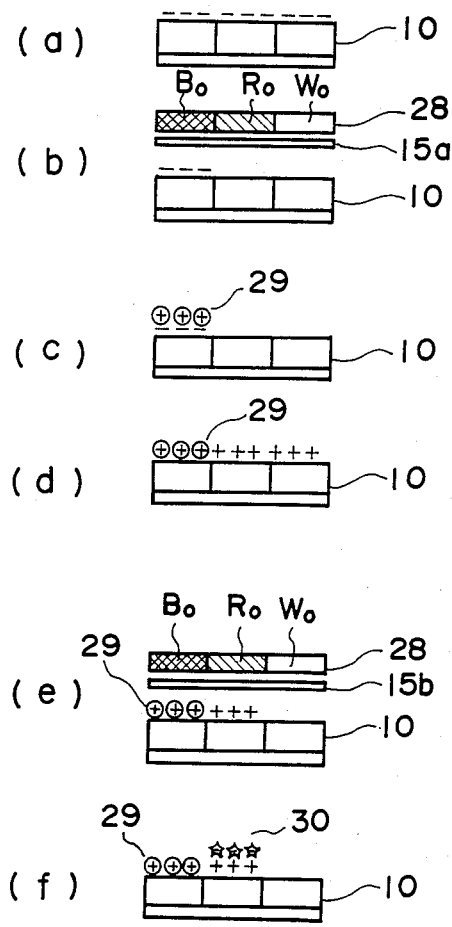
FIG. 8 is a model of a process which shows steps of forming an image, using the two-color image forming apparatus of the present invention.

An image forming process will be described relating to the two-color image copying apparatus in which the secondary charge unit 12 is incorporated. As shown in FIG. 8a, a negative or a primary charge is uniformly applied to the surface of the photosensitive body 10 by means of the primary charge unit 11. When a light image on an original 28 (which has white, red and black portions Wo, Ro and Bo) is subjected to image exposure (or first exposure) through or not through the red filter 15a, the surface potential of those portions on the photosensitive body 10 which correspond to red and white are substantially reduced because of light attenuation, but that portion on the photosensitive body 10 which corresponds to black is not light-attenuated, so that the first electrostatic latent image can be formed, as shown in FIG. 8b, its surface potential kept at initial level.

When this first electrostatic latent image is developed, as first development, by means of the first developing unit 13 which contains black toner, positive-charged black toner 29 sticks only to the black-corresponding portion of the photosensitive body 10, as shown in FIG. 8c. For the purpose of preventing red toner 30 from sticking onto the black-corresponding portion of the photosensitive body 10 at the time of red development, it is extremely important that the potential at the black-corresponding portion after black development is kept almost same as that before the black development, and that the potential difference of the red- and white-corresponding portions relative to the black-corresponding portion is held to be an appropriate value. In order to achieve this purpose, it is necessary the resistance of a developing agent when this agent consists of one component, or resistance of carrier or of carrier and toner when the developing agent consists of two components is sufficiently high at the time of developing a first color. More specifically, when the resistance of the developing agent is low at the time of black development, charge at the black-corresponding portion leaks to the side of the developing unit through the developing agent to lower the potential while charge is put from the developing unit side into the red- and white-corresponding portions to increase their potential, so that the potential difference of the red- and white-corresponding portions relative to the black-corresponding portion is decreased. When secondary charge is applied without taking any countermeasure, therefore, the potential difference of the red- and white-corresponding portions relative to the black-corresponding portion becomes smaller. This is the reason why the developing agent is selected to have a resistance larger than $10^9$ Ωcm because little potential reduction is caused by charge leak at the black-corresponding portion and because no change is caused in potential at the red- and white-corresponding portions.

When positive or secondary charge which is reverse in polarity to the primary charge is applied to the surface of the photosensitive body 10, using the secondary charge unit 12 provided with the corona ion flow control screen 22, potential polarity at the white- and red-corresponding portions is inverted and charged positive, as shown in FIG. 8d, but surface potential at the black-corresponding portion is lowered by the positively-charged polarity to thereby become zero in level because the black-corresponding portion is held to have high potential of negative polarity. According to this secondary charge, therefore, potential at the white- and red-corresponding portions which has been lowered to zero level of negative polarity by light attenuation can be inverted to high potential of positive polarity to enable developing, while potential at the black-corresponding portion can be restrained to a potential level which is sufficiently lower than development-enabling potential. Conventionally, corona ions of reverse polarity concentrate in the course of the secondary charge to flow into black fine lines and edges of the first image which are high in electric field contrast when compared with their circumjacent portions, thereby causing their potential to be enhanced to reverse polarity and red toner to be stuck on black toner which has already stuck to the surface. On the contrary, corona ions caused by the secondary charge unit 12 flow toward the photosensitive body 10 in a direction normal to the surface of the photosensitive body 10 in the case of the present invention. In addition, the speed of corona ion flow is so high that corona ions can have high straight-advancing capacity, thereby preventing corona ions from concentrating onto partial portions and red toner from being stuck onto the fine lines and edges of the first image.

According to the present invention, charge (or secondary charge) is carried out, using the corona ion flow control screen, and therefore, potential contrast which is sufficient to prevent the second image forming toner from being stuck onto the fine lines and edge of the first image can be obtained.

When image exposure (or second exposure) relating to the original 28 is carried out through the cyanic filter 15b, which shields red light component, synchronizing with the time of forming the first electrostatic latent image after the secondary charge, potential at the white-corresponding portion is largely reduced because of light attenuation but potential at the red-corresponding portion is not light-attenuated but kept at a potential level which is the same at the time of the secondary charge because the red-corresponding portion is not illuminated from a high source, thereby enabling a second electrostatic latent image to be formed, leaving charge only at the red-corresponding portion, as shown in FIG. 8e. When this second electrostatic latent image is then subjected to development (or second development), using the second developing unit 14 which contains red toner, negative-charged red toner 30 adheres only to the red-corresponding portion, as shown in FIG. 8f. Therefore, the black-corresponding portion on the photosensitive body 10 is developed by the positive-charged black toner 29 while the red-corresponding portion thereon by the negative-charged red toner 30, so that a two-color toner image can be formed brilliantly and in sufficient density.

This two-color toner image on the photosensitive body 10 is transferred on a sheet of transferring paper by means of the transfer unit 17 and fixed thereon to form a final two-color image. The manner of transferring can be achieved using static electricity, pressure, heat and the like, and it is necessary in the case of the electrostatic transfer manner that the charge of one toner is inverted by the polarity adjusting unit 16 before the tranferring step because the two-color image on the photosensitive body 10 is formed by two-color toners which are charged positive and negative, respectively. If the negative-charged toner at the red-corresponding portion is inverted by the corona discharge unit to have positive polarity, for example, the whole of the toner image can be transferred by applying a charge of negative polarity to the back of the transferring paper at the time of transferring process.

As described above, the two-color image-forming apparatus of the present invention enables two-color (red and black) copies, brilliant and sufficiently thick, to be obtained because the second image forming toner is not stuck onto the fine lines and edges of the first image.

Figure 9:
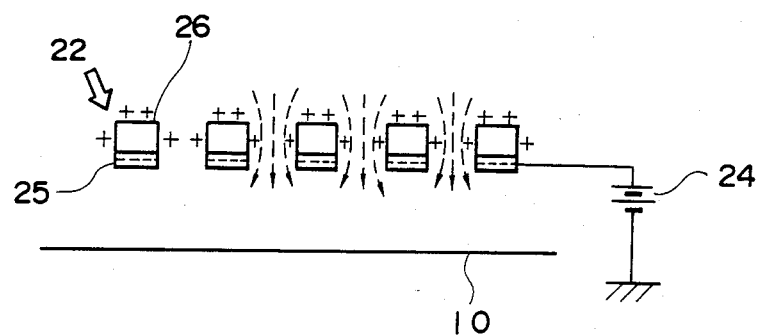
FIGS. 9 and 10 show examples of the corona ion control screen.

The same effects can be achieved even if conductors of the corona ion flow control screen are arranged parallel to one another, like a lattice or like concentric circles. The section of the conductor is not limited to a circle but it may be of square, as shown in FIG. 9.

The corona ion flow control screen may also comprise coating a photosensitive resist material, 30–200 μm thick, onto a conductive plate made of iron, aluminium or copper, for example, and provided with a plurality of pinholes, said plate being 0.01–1.0 mm thick; printing a hole pattern thereon; and applying an appropriate chemical liquid thereto.

The corona ion flow control screen may also comprise forming fine lines like a net, these lines being made of one of the above-mentioned materials, and coating only one face of the net with an insulating resin, 30–200 μm thick, according to the spraying manner, or it may also comprise vaporing an appropriate material, several micromilimeters to several tens μm thick, only on one face of a plastic net.

The size and density of these holes are determined depending upon several conditions such as charged potential, latent image potential, exposure and development at the process of forming the two-color image.

The form of these holes may be circular, polygonal or indeterminate, and when it is circular, favorable results can be obtained if its diameter is smaller than 1 mm.

The voltage set to be applied to the conductors of the corona ion flow control screen is changed depending upon the make-up and form of the screen, effective diameter of the hole, and the like. When voltage which is reverse in polarity to corona ions is applied, the corona ions are absorbed by the conductors to thereby reduce ion passing efficiency. When unnecessarily-high voltage which is the same in polarity as the corona ions is applied, the electric flux lines caused between the conductors of the screen prevent the ions from passing between the conductors to thereby reduce the ion passing efficiency, too.

When the net-like screen has 16–300 meshes and the corona ions are positive in polarity, a voltage of 1–3 KV is, favorable.

It is more effective if the interval between the corona ion flow control screen and the surface of the photosensitive body is made as small as possible. When they are arranged too near to each other, however, spark discharge is caused between the surface of the photosensitive body and the conductors. In the case of the above-described embodiment of the present invention, therefore, it is preferable that the interval between the conductors of the corona ion flow control screen and the surface of the photosensitive body ranges 1–5 mm.

Figure 10:
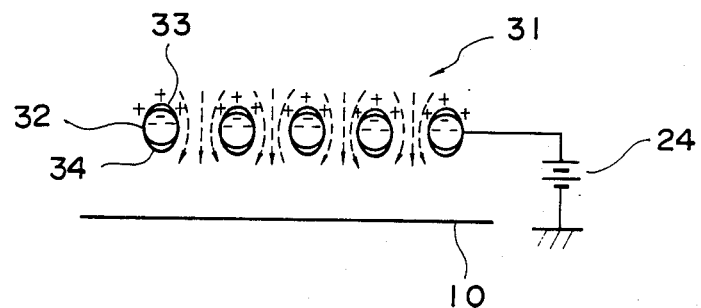

FIG. 10 shows a further example of the corona ion flow control screen, which is different from the above-described examples in that insulating material is formed on both sides of each of the conductors of the corona ion flow control screen which are directed to both corona wire and photosensitive body sides. More specifically, a corona ion flow control screen 31 comprises conductors 32 and insulating portions 33, 34 which are formed on top and bottom sides of each of the conductors 32.

The corona ion flow control screen 31 thus formed can restrain the spark discharge from being caused between the surface of the photosensitive body 10 and the conductors 32 because of the insulating portions 34 formed on the side of the photosensitive body 10, so that the interval between the corona ion flow control screen 31 and the surface of the photosensitive body 10 can be made smaller. In addition, the corona ion flow control screen 31 may be formed variously as already described in the case of the above-mentioned examples, because it is different from the above-described corona ion flow control screen 22 only in that the insulating portions are formed on both corona wire and photosensitive body sides of the conductors.

Although the voltage applying power source has been used to bias the screen in the case of the above-described examples, the conductors of the corona ion flow control screen may be grounded through the resistance or the like. Voltage which corresponds to the resistance occurs in this case because corona ions flow between the conductors. The resistance value of this resistance interposed can be optionally selected depending upon the form of the screen, charging voltage set, and the like.

Figure 11:
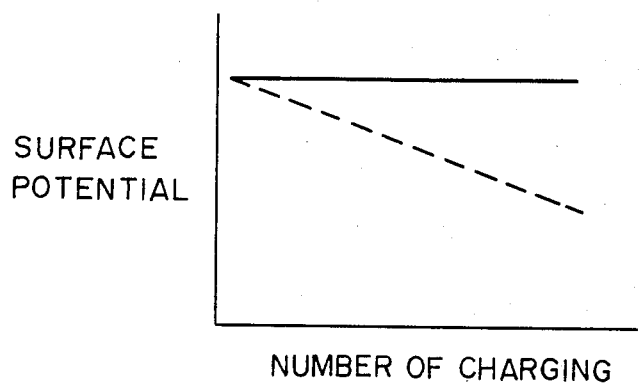
FIG. 11 is a graph showing a relationship between surface potential and number of times charged.

Although the above-described examples have had such construction that DC voltage is supplied to the corona wire 21 of the secondary charge unit 12, charging efficiency falls at the time of secondary charge to gradually reduce surface potential after the secondary charge of reverse polarity, as shown by a broken line in FIG. 11, when image forming is repeated without changing voltage applied to the corona wire. This is because corona ions emitted from the corona wire adhere excessively to the insulating portions of the corona ion flow control screen to thereby prevent successive corona ions from passing through the corona ion flow control screen.

Figure 12:
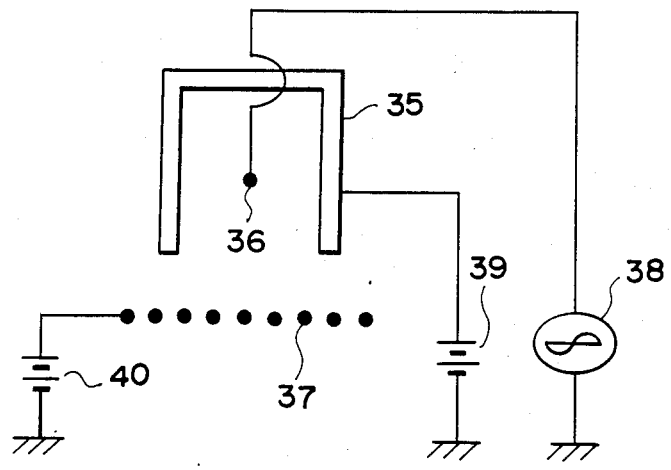
FIG. 12 shows another example of the secondary charge unit.

This problem can be solved by an example of the secondary charge unit, which is shown in FIG. 12 and which comprises a shield 35, corona wire 36, corona ion flow control screen 37, AC power source 38, shield biasing power source 39, and screen biasing power source 40. The opening of the shield 35 is 20–30 mm wide, and the corona wire 36 is made of tungsten or gold-plated tungsten having a diameter of 50–80 $\mu$m. A predetermined AC voltage is applied from the AC power source 38 to the corona wire 36. A predetermined DC bias voltage is applied from the shield biasing power source 39 to the shield 35. The corona ion flow control screen 37 is arranged at or near the opening of the shield 35 and a predetermined DC bias voltage is applied from the screen biasing power source 40 to the corona ion flow control screen 37.

With respect to FIG. 6, the corona ion flow control screen 37 includes conductors and insulating portions, which are formed on those sides of the conductors which are directed to the side of the corona wire 36. When discharge is done, electric flux lines are caused between the conductors of the corona ion flow control screen 37.

Figure 13:
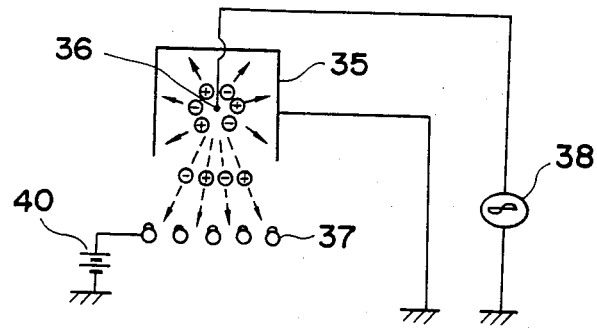
FIG. 13 shows the secondary charge unit operating.
Figure 13:
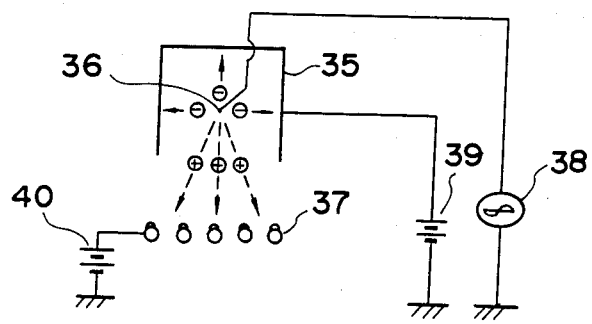
Figure 13:
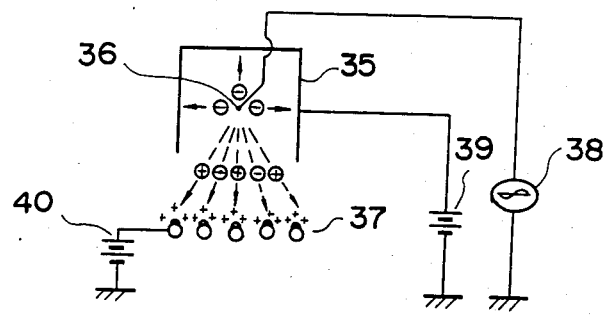

The function of this secondary charge unit will be described in detail, referring to FIG. 13. When AC voltage is applied, positive and negative corona ions are emitted from the corona wire, and it is assumed for the sake of clarity that the positive corona ions are the same in volume as the negative ones. When voltage applied to the shield 35 is 0 V, the positive and negative corona ions emitted from the corona wire 36 flow in same ratio to the side of the shield 35 and also toward the opening of the shield 35, as shown in FIG. 13a. When positive or negative bias voltage continues to be applied to the shield 35, negative or positive corona ions emitted from the corona wire 36 selectively flow to the shield side, while positive or negative corona ions in sufficient amount approach the opening of the shield 35 to charge the corona ion flow control screen 37 at first and then the photosensitive body gradually. When positive bias voltage is applied to the shield 35, for example, negative corona ions of the positive and negative ones emitted from the corona wire 36 flow selectively to the shield 35, while numerous positive ones arrive at the corona ion flow control screen 37, as shown in FIG. 13b. The insulating portions of the corona ion flow control screen 37 are charged at first and because of electric field thus caused between the insulating portions and the conductors, positive ions are allowed to pass through the opening to charge the photosensitive body.

As image forming is repeated and charging is also repeated, positive corona ions begin to unnecessarily adhere to the insulating portions of the corona ion flow control screen 37. As shown in FIG. 13c, the charged amount of the corona ion flow control screen 37 itself rises and therefore, negative corona ions automatically become more numerous than those which arrive at the insulating portions, thereby neutralizing excessive positive corona ions on the insulating portions.

The amount of positive corona ions which adhere onto the insulating portions can be thus kept certain, thereby holding charging efficiency certain, too.

The copying process achieved by the two-color image copying apparatus into which the above-described secondary charge unit is incorporated will be described in reference to FIG. 14.

Using the primary charge unit connected to the DC power source of $-6.5$ KV, negative charge (or primary charge) is uniformly applied to the surface of the bipolar photosensitive body to set the surface potential of the photosensitive body $-550$ V (see FIG. 14a).

When the light image of an original OR (which has red Ro and black Bo on white Wo) is subjected to image exposure (or first exposure) whether or not through the red filter, surface potential at the red- and white-corresponding portions on the photosensitive body substantially falls from $-550$ V to $-50$ V because of light attenuation, but the black-corresponding portion is not light-attenuated and the first electrostatic latent image is formed, keeping its surface potential at initial level (see FIG. 14b).

When this first electrostatic latent image is subjected to development (or first development), applying a bias voltage of $-200$ V to the first developing unit in which black toner is held, the positive-charged black toner adheres only to the black-corresponding portion on the photosensitive body (see FIG. 14c). For the purpose of preventing red toner from adhering even to the black-corresponding portion on the photosensitive body at the time of subsequent red development, it is very important that potential at the black-corresponding portion before black development is hardly changed after the black development (see FIG. 14b) and that potential difference between the red- and white-corresponding portions and the black-corresponding portion is held at an appropriate value. And this purpose can be achieved as already described above.

When secondary charge of positive polarity is applied to the surface of the photosensitive body, impressing AC voltage of 6.2 KV, which has a frequency of 300 Hz, to the corona wire, DC voltage of $+3.5$ KV to the shield, and DC voltage of $+2.5$ KV to the conductors of the corona ion flow control screen, potential polarity at the white- and red-corresponding portions is inverted and charged to positive polarity of $+450$ V, but since the black-corresponding portion is held at a higher potential of negative polarity from the beginning, its surface potential is reduced to the zero in level because of its being positive-charged (see FIG. 14d). According to the qharge (or secondary charge), potential at the white- and red-corresponding portions whose negative polarity has been reduced because of light attenuation is inverted to higher positive one to enable development, while potential at the black-corresponding portion is restrained to a level sufficiently lower than the potential which enables the development.

When the original OR is again subjected to image exposure (or second exposure) through the cyanic filter, which shields red light component, after the secondary charge, synchronizing with the time of forming the first electrostatic latent image, potential at the white-corresponding portion is substantially reduced to $+50$ V because of light attenuation, but potential at the red-corresponding portion is not light-attenuated because the red-corresponding portion is not shone by light, and it is held at $+450$ V which is the level at the time of secondary charge, thereby enabling the second electrostatic latent image to be formed, leaving only the red-corresponding portion charged (see FIG. 14e).

When the second electrostatic latent image is developed by the red developing unit, negative-charged red toner adheres only to the red-corresponding portion (see FIG. 14f).

Therefore, the black-corresponding portion on the photosensitive body is developed by positive-charged black toner and the red-corresponding portion thereon by negative-charged red toner, thereby enabling the two-color toner image to be formed brilliant and sufficiently thick.

This two-color toner image on the photosensitive body is transferred onto the transferring paper and fixed thereon, thereby enabling a final two-color image to be obtained.

Although the secondary charge step was repeated 10,000 times, initial secondary charge efficiency showed no change and two-color images, sufficiently thick and stable in black and red, were obtained.

As described above in relation to the first embodiment of the present invention, the corona ion flow control screen may have any of the above-mentioned structures. In addition, it may have a triple layer structure which comprises laminating insulating portions, conductors and insulating portions one upon the other in this order.

Although any of the above-described examples has been related to the two-color image copying apparatus, the present invention can be applied to the two-color image forming printer in which image exposure is carried out using the liquid crystal micro-shutter array or LED array. It is unnecessary in this case to use the red filter, cyanic filter, and the like to achieve color separation, but the same liquid crystal micro-shutter array or LED array may be driven at the time of first image formation by an image signal which corresponds to the first image and at the time of second image formation by an image signal which corresponds to the second image.

Although any of the above-described examples has been based on the process of forming the first image and then applying the second charge, the present invention can be applied to a two-color image forming process and apparatus for achieving the process wherein the surface of the bipolar photosensitive body is uniformly charged negative; image exposure is carried out through the red filter to form the first electrostatic latent image; that portion of the photosensitive body surface from which the not-exposed portion is excluded is charged positive; image exposure is again carried out through the cyanic filter to form the second electrostatic latent image; and the first and second electrostatic latent images are successively developed by the developing units and thus made visible, the developing units containing black, red and other color toners which are charge reverse in polarity alternately.

FIG. 15 shows an example of the two-color image copying apparatus by which this two-color image forming process can be achieved. The copying apparatus comprises a bipolar photosensitive body 41 rotatable in a direction shown by an arrow, and its circumjacent corona discharge units 42, 43, developing units 44, 45, a polarity adjusting unit 46, transfer unit 47, separator 48, cleaner 49 and eraser lamp 50 wherein the primary exposure through a red filter 51 is carried out between the corona discharge unit 42 for primary charge and the corona discharge unit 43 for secondary charge, and wherein the secondary exposure through a cyanic filter 52 is carried out between the corona discharge unit 43 and the primary developing unit 44.

Figure 16:
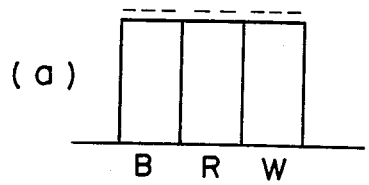
FIG. 16 is a change chart showing the surface potential of the photosensitive body at the process of forming the two-color image.
Figure 16:
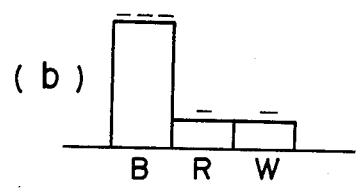
Figure 16:
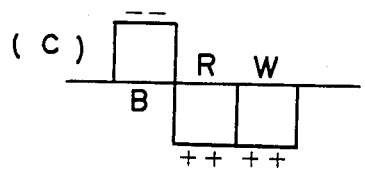
Figure 16:
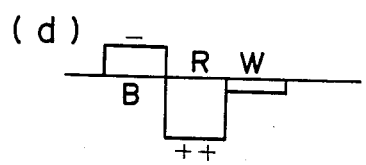

FIG. 16 shows how the surface potential of the photosensitive body changes when the above-described process is carried out. Charge (or primary charge) is applied to the photosensitive body to uniformly charge its surface negative (FIG. 16a), and an original (which has a red and black image on white) is subjected to image exposure (or primary exposure) through the red filter to form the first electrostatic latent image (FIG. 16b).

Red- and white-corresponding portions R and W of the first electrostatic latent image on the photosensitive body surface are inverted positive by charge (or secondary charge) of reverse polarity (FIG. 16c), and image exposure (or secondary exposure) is again carried out through the cyanic filter to form the second electrostatic latent image (FIG. 16d).

In the case of this process, however, even the first electrostatic latent image is irradiated by cyanic light to thereby reduce potential when the image exposure is again carried out through the cyanic filter. This potential reduction is remarkable particularly at the low potential portion of the first electrostatic latent image, that is, at that portion of the first electrostatic latent image which corresponds to the halftone portion of the black image. Therefore, the black image is insufficient in thickness and this insufficiently-thick portion of the black image is coarsely reproduced, thereby causing the whole of the black image to be made inferior in gradation.

Figure 17:
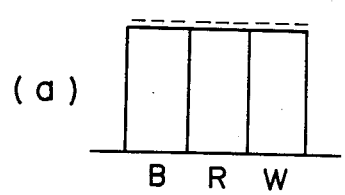
FIG. 17 is also a change chart showing the surface potential of the photosensitive body at the process of forming the two-color image in the case of the present invention.
Figure 17:
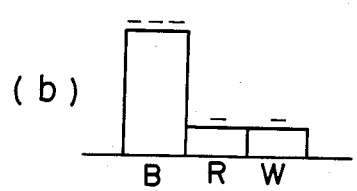
Figure 17:
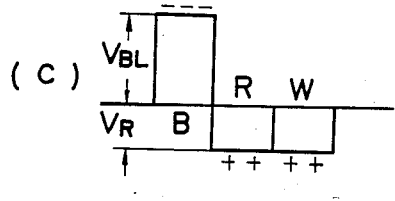
Figure 17:
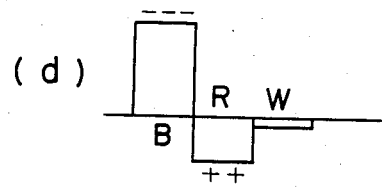

In the case of this two-color image copying apparatus, therefore, potential is set as shown in FIG. 17. Using the corona discharge unit 42 connected to a DC power source of $-6.3$, charge (or primary charge) is uniformly applied to the photosensitive body 41 to charge its surface negative, and image exposure (or first exposure) is then applied to the surface of the photosensitive body 41 through the red filter 51. The red- and white-corresponding portions are light-attenuated to thereby reduce their surface potentials from their initial level shown in FIG. 17a to a level shown in FIG. 17b, while the black-corresponding portion B is not light-attenuated to thereby keep its surface potential at the initial level ($-500$ V) and form the first electrostatic latent image.

When charge (or secondary charge) is uniformly applied to the photosensitive body surface by means of the corona discharge unit 43 which is reverse in polarity to the one employed in FIG. 17a and which is provided with the corona ion flow control screen, potential polarities at the white- and red-corresponding portions W and R are inverted and charged positive ($+150$ V). Since the black-corresponding portion was originally charged to have high negative potential, such negative potential that allows the black-corresponding portion to be developed brilliantly is still left at the black-corresponding portion even if its surface potential is reduced to some extent by the positive charge. Therefore, the potential applied from the corona discharge unit 43 by this process is such that it causes light-attenuated potentials at the white- and red-corresponding portions W and R to be inverted to so positive ones as to enable these portions to be developed, and that it causes potential at the black-corresponding portion not to be reduced lower than a negative potential which makes it impossible for the black-corresponding portion to be developed.

It is important this time that absolute value $|V_{BL}|$ of potential $|V_{BL}|$ at the black-correspoding portion B and absolute value $|V_R|$ of potential $V_R$ at the red-corresponding portion R are set $|V_{BL}| > |V_R|$, more preferably $|V_R/V_{BL}| < \frac{1}{2}$, and that potential at the white-corresponding portion is thus sufficiently light-attenuated by a small amount of light at the subsequent exposing step through the cyanic filter. When set like this and image exposure (or second exposure) is again carried out through the cyanic filter 52, the whole of the white-corresponding portion W is uniformly light-attenuated and potential at the red-corresponding portion R is light-attenuated according to the thickness of the original, thereby forming the second electrostatic latent image (FIG. 17d). More preferably, the sensitivity of the photosensitive body employed is set slower at the time of negative charge than at the time of positive charge, that is, the sensitivity at the time of negative charge is set half or less than that at the time of positive charge. When set like this, light attenuation of the white-corresponding portion W can be made increased further when exposed by cyanic light and negative potential which represents the first electrostatic latent image is left almost not influenced. The bipolar photosensitive body 41 employed had a half-value exposure or sensitivity of 5.01 ux·s at the time of negative charge and a sensitivity of 2.01 ux·s at the time of positive charge.

When the first and second electrostatic latent images thus formed are developed, as described above, by two kinds of toners which are charged reverse in polarity to each other, and more specifically, when their black-corresponding portion B is developed by positive-charged black toner while their red-corresponding portion R by negative-charged red toner, two-color image is formed and this two-color image formed on the surface of the photosensitive body is transferred and fixed on a transferring paper 53, thereby allowing a brilliant two-color (red and black) image to be obtained.

Charging which is carried out by the above-described discharge unit provided with the screen can be applied to a two-color process which will be shown as a further example, and an apparatus which can achieve this two-color process will be described below.

Figure 18:
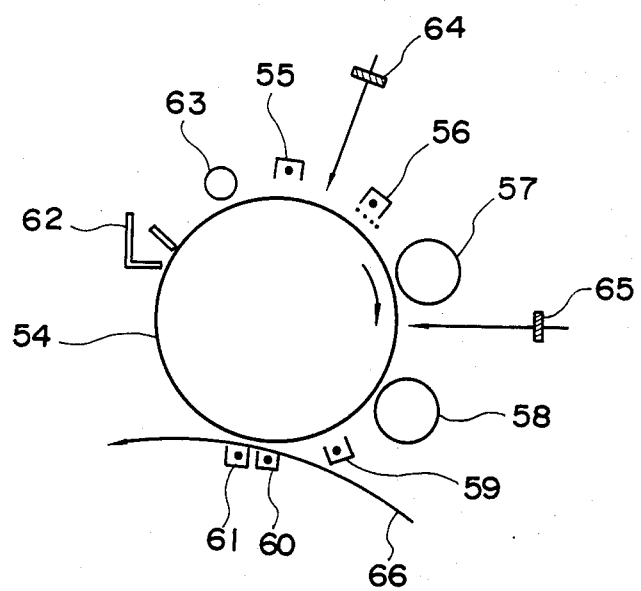
FIG. 18 shows a further example of the two-color image forming apparatus according to the present invention.

FIG. 18 shows an example of the two-color image copying apparatus. A photosensitive body 54 is arranged rotatable in a direction shown by an arrow and comprises forming a layer of bipolar organic semiconductor on a cylindrical aluminum substrate. Arranged around the photosensitive body 54 are corona discharge units 55, 56 two-component developing units 57, 58, a polarity-adjusting unit 59, transfer unit 60, separator 61, cleaner 62 and eraser lamp 63.

Figure 19:
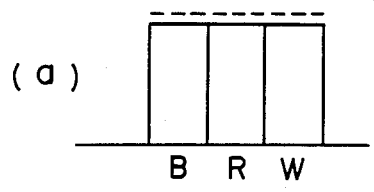
FIG. 19 is a change chart showing the surface potential of the photosensitive body at the process of forming the two-color image in the case of the present invention.
Figure 19:
Figure 19:
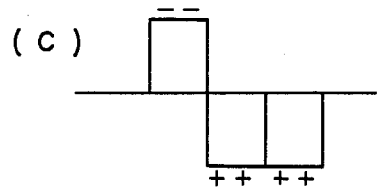
Figure 19:
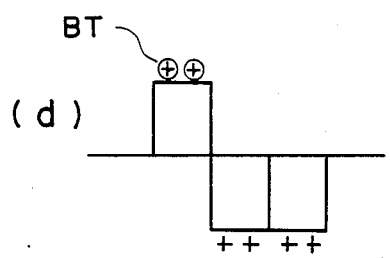
Figure 19:
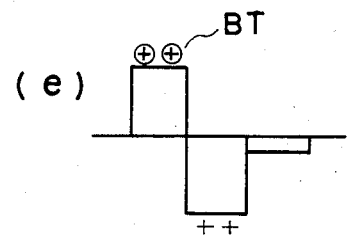
Figure 19:
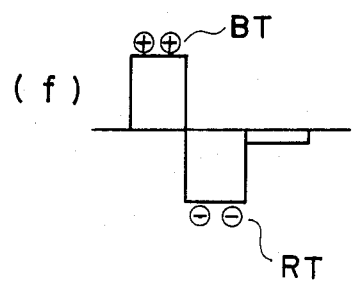

Charge (or primary charge) is uniformly applied to the photosensitive body 54, using the corona discharge unit 55 connected to a DC power source of $-6.3$ KV (see FIG. 19a), and the original (which has a red and black image on white) is irradiated by an exposure lamp (not shown) and using its reflected light, exposure (or first exposure) is applied to the photosensitive body 54 through a red filter 64 to obtain a first electrostatic latent image. Surface potential at the black-corresponding portion B was $-500$ V and each of those at the red- and white-corresponding portions R and W was $-50$ V just after the image exposure (see FIG. 19b). Charge (or secondary charge) is then applied to the photosensitive body 54 to charge its surface reverse in polarity, using the corona discharge unit 56 connected to a DC power source of +6.5 KV. The corona discharge unit 56 has a screen member comprising laminating insulating portions on metal conductors and having a plurality of apertures located at or near the shield opening which faces the photosensitive body 54. Charge relative to the photosensitive body 54 is carried out in such a way that the conductors are directed to the photosensitive body 54 and that voltage of +2.5 KV is applied to the conductors. In the case of this example, the screen comprises insulating portions and conductors having a lattice form of 200 meshes and an aperture efficiency of 40%.

When charge is carried out using the corona discharge unit 56 provided with the above-described screen member, positive corona ions are given straightly-advancing capacity by electric fields caused between the insulating portions and the conductors and also between the conductors and the photosensitive body, thereby enabling positive polarity charge to be carried out without disturbing the first electrostatic latent image.

Surface potential on the photosensitive body 54 just after being charged like this was −250 V at the black-corresponding portion B and +200 V at the white- and red-corresponding portions (see FIG. 19c).

Only the black-corresponding portion is developed, as first development, with black toner BT, using the developing unit 57 to which developing bias +100 V is applied. When a carrier of the resin mixture type which has a volume resistivity of $10^{13}$ Ωcm and which consists of the mixture of ferrite and resin is used this time, surface potential on the photosensitive body hardly leaks at the time of developing and no change is caused of potentials at the white- and red-corresponding portions W and R (see FIG. 19d).

When the original is again irradiated by the exposure lamp and the photosensitive body 54 is exposed, as second exposure, by its reflected light passing through the cyanic filter 65, the black-and red-corresponding portions B and R are still left −250 V and +200 V, respectively, but the white-corresponding portion is sufficiently light-attenuated to become +30 V, thereby forming a second electrostatic latent image (see FIG. 19e). The second electrostatic latent image thus formed is developed, as second development, with red toner RT of negative polarity which is reverse in polarity to the potential at the red-corresponding portion R, using the developing unit 58 to which developing bias +50 V is applied (see FIG. 19f). The carrier which is used this time is also of the resin mixture type.

The polarity of the red toner RT on the photosensitive body 54 is inverted positive by the polarity adjusting unit 59 to which voltage of +4.8 KV is applied, both of red and black toner images are transferred onto a transferring paper 66 by means of the transfer unit 60 to which −5.0 KV is applied, the transferring paper 66 is separated from the photosensitive body 54 by the separator 61 to which AC 4.8 KV is applied, and the transferring paper 66 is subjected to fixture by means of a fixing unit (not shown). A brilliant two-color (red and black) image was thus obtained.

Toner left on the photosensitive body 54 is removed by the cleaner 62 and potential remaining on the photosensitive body 54 is erased by the eraser lamp 63, thereby becoming ready for the next process.

Since black image portion is formed on the photosensitive body 54 before the second image exposure is carried out through the cyanic filter 65 in the case of this example, as described above, no reduction of image thickness is caused by the potential fall at the black-correponding portion at the time of the second image exposure.

The corona ion flow control screen will be further described. In a case where an angle $\theta$ which is formed by the direction in which apertures are arranged and by the direction (shown by an arrow in FIG. 20) in which charge is advanced is 90 degrees, for example, as shown in FIG. 20, the surface potential of the photosensitive body changes as shown in FIG. 21 at the processes which have been described in FIGS. 17 and 19, for example. More specifically, when the surface of the bipolar photosensitive body which comprises forming a photoconductive layer on a conductive substrate is uniformly charged negative in polarity, and a light image on an original which has black and red on white is exposed through the red filter to form a first electrostatic latent image, the surface potential of the photosensitive body changes as shown in FIGS. 21a and 21b. When a corona ion flow control screen in FIG. 20 which comprises laminating insulating portions on conductors and which has a plurality of apertures is arranged at the corona ion irradiating opening and red- and white-corresponding portions of the first electrostatic latent image on the photosensitive body surface are inverted positive in polarity by means of the positive polarity charging secondary charge unit which applies positive voltage to the conductors, the surface potential of the photosensitive body changes as shown in FIG. 21c. When image exposure is then again carried out through the cyanic filter to form a second electrostatic latent image, the surface potential of the photosensitive body changes as shown in FIG. 21d. This is supposedly because charging irregularity is caused depending upon aperture arrangement and pitch of the corona ion flow control screen. In the case where the first and second electrostatic latent images thus formed are developed by two kinds of different color toners which are charged reverse in polarity to each other to form a two-color image, therefore, both of the red and black images are not made uniform because charging irregularity, thereby making it impossible to obtain a brilliant two-color image.

In order to prevent the charging irregularity from being caused by the corona ion flow control screen, therefore, the angle $\theta$ formed between the aperture arranging direction and the charge advancing direction (shown by an arrow in FIG. 22) was changed as shown in FIG. 22. It will be described what relationship the charged state has in relation to the angle $\theta$, pitch of the lattice and thickness of the insulating portion.

Stainless lines were knitted like a lattice (300 meshes and aperture efficiency 40%). This lattice was coated, about 10 μm thick, by a photoresist material such as polyester of the light curing type, for example, and then light-cured. Using the corona ion flow control screen thus formed and changing the angle $\theta$ formed between the charge advancing direction and the aperture arranging direction (see FIG. 22), occurrence of the charging irregularity was examined. Table 1 shows the result.

TABLE 1

| Angle ($\theta$) | 0° | 5° | 10° | 15° | 20° |
|---|---|---|---|---|---|
| Charging irregularity | X | X | △ | ○ | ○ |
| Angle ($\theta$) | 25° | 30° | 35° | 40° | 45° |
| Charging irregularity | ○ | ○ | ○ | △ | △ |
| Angle ($\theta$) | 50° | 55° | 60° | 65° | 70° |
| Charging irregularity | △ | ○ | ○ | ○ | ○ |

TABLE 1-continued

| Angle ($\theta$) | 75° | 80° | 85° | 90° |
|---|---|---|---|---|
| Charging irregularity | ○ | △ | X | X |

In Table 1, ○ represents no charging irregularity, △ a little charging irregularity but no problem on image quality and X charging irregularity.

In a case where the angle $\theta$ was around 90°, lattices of the screen were juxtaposed in same direction as the charge advancing direction, and charging difference between the apertures and the non-aperture portion became large to cause the charging irregularity, but the charging irregularity could be restrained in this example when the angle $\theta$ ranged between 10°–80° and no charging irregularity was caused, particularly when the angle $\theta$ ranged between 15°–35° or 55°–75°.

Using the corona ion flow control screen which comprised knitting stainless lines like a lattice and coating them with polyester of the light curing type, about 10 μm thick, and changing the size of mesh of the screen, the blurring of image was examined. The angle $\theta$ was 30°. Table 2 shows the result, in which ○ represents almost no blurring, △ a little blurring but no problem and X blurring.

TABLE 2

| Mesh (M) | Blurring | Aperture pitch (μm) |
|---|---|---|
| 100 | X | 254 |
| 150 | △ | 269 |
| 200 | ○ | 127 |
| 300 | ○ | 85 |
| 400 | ○ | 63 |
| 500 | ○ | 51 |

The imaging blurring can be almost prevented when the number of meshes is more than 150 meshes, particularly more than 200 meshes, as apparent from Table 2.

Using the corona ion flow control screen which comprises knitting stainless lines like a lattice, and changing the thickness of polyester of the light curing type, which was coated on the latticed stainless lines, from 0 μm to 40 μm, secondary change effect was examined. The angle $\theta$ was 30°. Table 3 shows the result, in which represents being easily charged, △ being difficultly charged, and X being no charged.

TABLE 3

| Thickness of coated film (μm) | 0 | 5 | 10 | 20 | 30 | 40 |
|---|---|---|---|---|---|---|
| Charge effect | X | ○ | ○ | ⊙ | ○ | △ |

As apparent from Table 3, substantially good charge effect can be obtained when the thickness of coated film is larger than 5 μm and particularly excellent charge effect can be obtained particularly when the film thickness ranges 5–30 μm.

In the above-mentioned cases, the stainless lines which were knitted like a lattice were used as the conductor members, but other metals such as iron, aluminium and copper may be used instead.

The form of the screen is not limited to the orthogonal lattice, but it may be of the oblique lattice. Or a thin plate prepared by etching and provided with pinholes may be used to achieve same effect. The shape of aperture is not limited to a rectangle but it may be a circle or the like.

Figure 23:
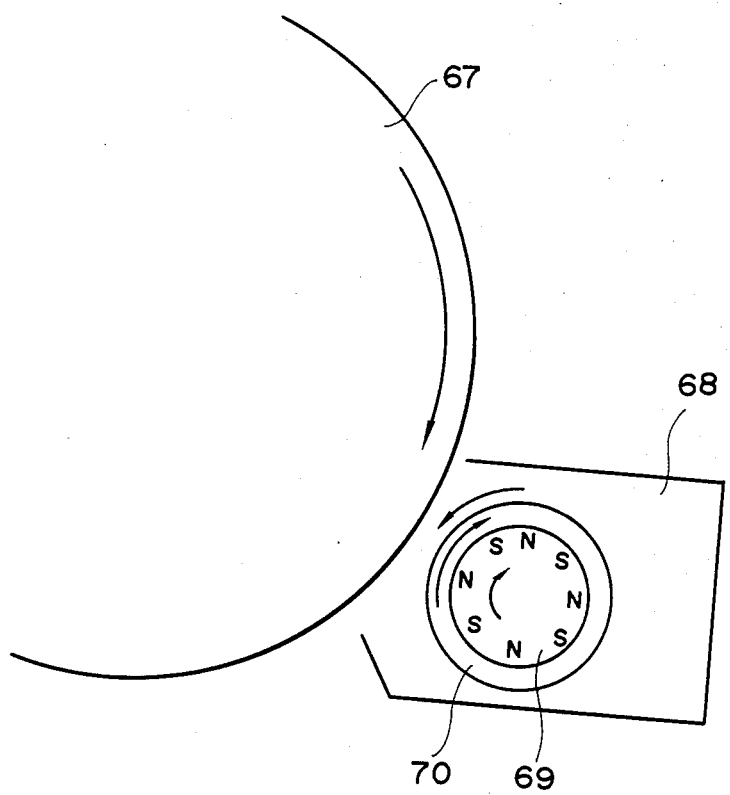
FIG. 23 shows a developing section employed.

In a case where black and red toners are used as the first and second developing agents, respectively, at the second development in the course of such two-color image forming processes as described above, the first-developed image is disturbed and made blurry because the magnetic brush slides the photosensitive body when development is carried out according to the usual brushing manner at the time of developing the second electrostatic latent image after the first electrostatic latent image is developed by black toner to form the first-developed image. Therefore, an improvement is made as follows. As shown in FIG. 23, a developing unit 68 is used which comprises a rotatable permanent magnetic roll 69 provided with a plurality of magnetic poles on the surface thereof, and a cylindrical rotatable non-magnetic sleeve 70 for housing the magnetic roll 69. The permanent magnetic roll 69 and non-magnetic sleeve 70 are rotated relatively in such a way that the permanent magnetic roll 69 is rotated more slowly than the non-magnetic sleeve 70, the magnetic brush is formed on the non-magnetic sleeve 70 by the developing agent used, and the developing agent is carried in same direction as the rotating direction of a photosensitive body 67 to bring the developing agent into contact with the photosensitive body. When the second development was carried out using a mixture of red toner and ferrite particles mixed at a weight percent of 15:100, the red toner having a particle diameter of 10–20 μm and being used as the developing agent, and said ferrite particles having an average particle diameter of 40 μm, a specific resistivity of $10^9$ Ωcm, and being used as carriers, the black image which has been previously formed was not disturbed to thereby enable a brilliant two-color image to be obtained. This is because the toner holding allowance of carriers is increased as the particle diameter of the carriers is made small, and because the buffering effect becomes high as a plenty of toner enters among the carrier particles, and the load which the magnetic brush exerts on the black toner adhered to the photosensitive body 67 becomes small. When the resistance of the carrier becomes small, electric charge is injected from the non-magnetic sleeve 70 into the photosensitive body through the head of the magnetic brush at the second developing step because of bias voltage which is the same in polarity as the black toner contained in the second developing unit to form the first image, potential at the black image portion is enhanced positively to electrostatically repel the positive-charged black toner, and the black toner is easily and physically influenced by the magnetic brush. Therefore, the carrier employed may have such a high resistance that causes no problem.

Quite the same developing process as the above-described first example was carried out, using red toner as the developing agent and also using, as the carrier, such particles that comprised dispersing magnetic fine power in an insulating resin, the red toner having an average particle diameter of 30–20 μm and the insulating resin having an average particle diameter of 30 μm and a volume resistivity of $10^{12}$ Ωcm. The black image was not blurred and a brilliant two-color image was obtained. This is because the magnetic material is not exposed on the carrier surface, the resin on the carrier surface serves as buffering material and influence exerted to the red toner is reduced even when the magnetic material contacts the red toner adhered onto the photosensitive body 67, and also because the carrier is lighter in specific weight than those such as usual iron powder carrier in which no resin is contained, and impact of the magnetic brush against the photosensitive body surface becomes weak. The carrier particles may be obtained in such a way that polyethylene, polyacrylic acid ester, polystyrene, epoxy resin, polymethylmethacrylate, or the like is used as its insulating resin, that iron oxide powder, reduced iron powder, ferrite or the like is used as its magnetic fine powder, and that the resin, magnetic fine powder and an optional charge control agent, if necessary, are solved and mixed, cooled and pulverized to select its particle diameter. Or similar particles which comprise capsuling a core material, which contains magnetic fine powder, by an optional resin according to the phase polymerization manner, polymer deposition manner or the like to prevent the magnetic material from being exposed on the surface of the particles may be used as the carrier particles. When the ratio of containing the magnetic material is too high, the magnetic material exposes on the surface of the carrier particles and impact of the magnetic brush against the photosensitive body is increased, thereby causing the above-mentioned effect to be restrained. When it is too low, however, carrying capacity is made worse and splattering of the particles is increased. It is therefore preferable that the magnetic material containing ratio ranges 30–90 weight percents (more preferably 60–80 weight percents).

As a further example, the same developing agent as those in the above-described examples was used, five kinds of ratios 2.5, 2.0, 1.0, 0.5 and 0.3 were selected of developing agent carrying speed relative to circumferential speed of the photosensitive body 67, and quite the same process as that in the second example was carried out. A two-color image was thus obtained and disorder of its black image was examined. Table 4 shows the result, in which O represents no disorder of the black image and X disorder of the black image.

TABLE 4

| Relative speed ratio | 2.5 | 2.0 | 1.0 | 0.5 | 0.3 |
|---|---|---|---|---|---|
| Disorder of black image | X | O | O | O | X |

As the relative speed becomes high, physical force which is applied from the magnetic brush to the photosensitive body 67 becomes strong to disturb the black toner adhered onto the photosensitive body 67, as apparent from Table 4. Therefore, the ratio of developing agent carrying speed relative to circumferential speed of the photosensitive body 67 preferably ranges between 2.0–0.5.

As described above, the present invention can prevent the first-developed image from being disturbed and scratched when the second development is applied to the photosensitive body on which the first-developed image is held. Therefore, a brilliant two-color (red and black) image can be obtained because no disorder is found of the black image which is the first-developed image.

When the corona discharge unit which is provided with the corona ion flow control screen arranged at or near the corona ion irradiating opening is used at the second development in the two-color image forming process, color mixture of the first and second images can be prevented to thereby enable a stable two-color image to be obtained. According to the two-color image forming apparatus provided with the corona discharge unit, corona ion flow is electrically accelerated by the corona ion flow control screen and becomes parallel flowing toward the surface of the photosensitive body in a direction normal thereto. Therefore, straight-advancing capacity of the corona ions is enhanced and the corona ions do not flow in a concentrated manner into those portions of the photosensitive body where potential difference relative to the corona wire is large, thereby enabling positive and negative potentials to be set large after the secondary charge. In addition, the secondary charge can be stably carried out without reducing charge efficiency, so that two-color images of excellent image quality can be obtained for a long time. Further, charge, exposure and development can be carried out without paying attention to the order of charging steps. Furthermore, when the mesh angle of the corona ion flow control screen is set about 10°–80° relative to the moving direction of the photosensitive body, neither charging irregularity nor developing irregularity is caused after the secondary charge.

As described above, the present invention enables a two-color image, in which both of its first and second images are brilliant, to be obtained.

What is claimed is:

1. Two-color image forming apparatus comprising a movable bipolar photosensitive body, first charging means for applying a predetermined polarity charge to a surface of said photosensitive body, first electrostatic latent image forming means for forming a first electrostatic latent image by exposing the surface of said photosensitive body which is charged by said first charging means, said first electrostatic latent image forming means arranged downstream of the first charging means along the moving direction of said photosensitive body, first developing means for developing said first electrostatic latent image, said first developing means provided downstream of an exposing portion in said first electrostatic latent image forming means along the moving direction of said photosensitive body, second charging means comprising a corona discharger having a corona ion stream control screen formed by laminating a conducting member with an insulating member, said corona ion stream control screen being disposed at or near an open portion for radiating a corona ion and applying a charge opposite in polarity to the charge applied by said first charging means to a surface of said photosensitive body, second electrostatic latent image forming means for forming a second electrostatic latent image by exposing the surface of the photosensitive body charged by said second charging means, said second electrostatic latent image forming means being disposed at a downstream side of said second charging means in the moving direction of the photosensitive body, and second developing means provided downstrean of an exposing portion in said second electrostatic latent image forming means along the moving direction of the photosensitive body.

2. Two-color image forming apparatus according to claim 1, wherein a charging section comprising said first and second charging means, an electrostatic latent image forming section comprising said first and second electrostatic latent image forming means, and a developing section comprising said first and second developing means are located in this order from upstream to downstream along the moving direction of said photosensitive body.

3. Two-color image forming apparatus according to claim 2, wherein each of the means which comprise said charging section, said electrostatic latent image forming section, and said developing section are operated sequentially in the following order of said first charging means, said first electrostatic latent image forming means, said first developing means, said second charging means, said second electrostatic latent image forming means, and said second developing means during at least one or more rotations of said photosensitive body in one image forming process.

4. Two-color image forming apparatus according to claim 1, wherein said first charging means, said first electrostatic latent image forming means, said second charging means, said second electrostatic latent image forming means, said first developing means, and said second developing means are located in this order from upstream to downstream along the moving direction of said photosensitive body.

5. Two-color image forming apparatus according to claim 1, wherein said first charging means, said first electrostatic latent image forming means, said second charging means, said first developing means, said second electrostatic latent image forming means, and said second developing means are located in this order from upstream to downstream along the moving direction of said photosensitive body.

6. Two-color image forming apparatus according to any one of the claims 2, 3, 4 or 5, wherein said corona discharger of the second charging means is a direct current corona discharger.

7. Two-color image forming apparatus according to any one of the claims 2, 3, 4 or 5, wherein said corona discharger of the second charging means is a direct current corona discharger and said insulating member is provided on a surface of said conductive member facing a corona ion radiating portion.

8. Two-color image forming apparatus according to claim 7, wherein said conductive member is grounded via a bias power source.

9. Two-color image forming apparatus according to claim 8, wherein the polarity of said bias power source is equal to the electric discharge polarity of said direct current corona discharger.

10. Two-color image forming apparatus according to claim 7, wherein said conductive member is grounded via a resistor.

11. Two-color image forming apparatus according to claim 7, wherein the distance between said conductive member and said photosensitive body is from 1 mm to 5 mm.

12. Two-color image forming apparatus according to any one of the claims 2, 3, 4 or 5, wherein said corona discharger of said second charging means is a direct current corona discharger and said insulating member is provided on a surface of said conductive member facing said corona ion radiating portion and on a surface of said conductive member facing said photosensitive body.

13. Two-color image forming apparatus according to claim 12, wherein said conductive member is grounded via the bias power source.

14. Two-color image forming apparatus according to claim 13, wherein the polarity of said bias power source is equal to discharging polarity of said direct current corona discharger.

15. Two-color image forming apparatus according to claim 12, wherein said conductive member is grounded via a resistor.

16. Two-color image forming apparatus according to claim 12, wherein the distance between said conductive member and said photosensitive body is from 1 mm to 5 mm.

17. Two-color image forming apparatus according to any one of the claims 2, 3, 4 or 5, wherein said corona discharger of said second charging means is an alternating current corona discharger and the conductive shielding of said corona discharger is grounded via a direct current power source.

18. Two-color image forming apparatus according to any one of the claims 2, 3, 4 or 5, wherein said corona discharger of said second charging means is an alternating current corona discharger, the conductive shielding of said corona discharger is grounded via a direct current power source and said insulating member is provided on a surface of said conductive member facing said corona ion radiating portion.

19. Two-color image forming apparatus according to claim 18, wherein said conductive member is grounded via a bias power source.

20. Two-color image forming apparatus according to claim 19, wherein the polarity of said bias power source is equal to that of said conductively shielded direct current power source.

21. Two-color image forming apparatus according to any one of the claims 2, 3, 4 or 5, wherein said corona discharger of said second charging means is an alternating current corona discharger, the conductive shielding of said corona discharger is grounded via a direct current power source, and said insulating member is provided on a surface of said conductive member facing said corona ion radiating portion and on a surface of said conductive member facing said photosensitive body.

22. Two-color image forming apparatus according to claim 21, wherein said conductive member is grounded via a bias power source.

23. Two-color image forming apparatus according to claim 22, wherein the polarity of said bias power source is same as that of said direct current power source for the conductive shield.

24. Two-color image forming apparatus according to any one of the claims 2, 3, 4 or 5, wherein said corona ion stream control screen is in lattice form, the angle between the arrangement direction of the opening holes forming the lattice and the moving direction of said photosensitive body is from 10° to 80°.

25. Two-color image forming apparatus according to any one of the claims 2, 3, 4 or 5, wherein said corona ion stream control screen of said second charging means is in lattice form, the angle between the arrangement direction of the opening holes forming the lattice and the moving direction of said photosensitive body is from 10° to 80°, and said insulating member is provided on corona ion generating side surface of said conductive member.

26. Two-color image forming apparatus according to claim 25, wherein pitch of the lattice is under 150 microns.

27. Two-color image forming apparatus according to claim 25, wherein said insulating member is 5 to 30 microns thick.

28. Two-color image forming apparatus according to claim 4, wherein a potential is set upon achieving the second charge in such a way that the absolute value of potential at that portion of said photosensitive body which is charged to have inverse polarity after the second charging is smaller than that at the portion of said photosensitive body whose electric potential is not charged even after the second charging charged.

29. Two-color image forming apparatus according to claim 28, wherein said photosensitive body is lower in sensitivity when charged to have the polarity of said first charge than when charged to have the polarity of said second charge.

30. Two-color image forming apparatus according to claim 29, wherein the sensitivity of said photosensitive body when charged to have the polarity of said first charge is half that of said photosensitive body when charged to have the polarity of said second charging.

31. Two-color image forming apparatus according to claims 2, 3, 4 or 5, wherein said second developing means has at least an insulating certain color toner as a developing agent and particles for friction-charging said color toner to have a polarity inverse to that of said second electrostatic latent image, said developing agent is applied onto the surface of a rotatable cylindrical non-magnetic sleeve in which a rotatable permanent magnetic roll having a plurality of polarities is housed, said non-magnetic sleeve being rotated in relation to said permanent magnetic roll and the developing agent, which is conveyed on the non-magnetic sleeve so as to form a magnetic brush in the same direction as the moving direction of the photosensitive body, is caused to contact the surface of said photosensitive body.

32. Two-color image forming apparatus according to claim 31, wherein particles in said developing agent comprise a magnetic material having a volume resistivity of more than $10^9$ $\Omega$cm and an average particle diameter of less than 70 μm.

33. Two-color image forming apparatus according to claim 31, wherein particles in said developing agent comprise magnetic small powder scattered in an insulating resin and the ratio of the magnetic small powder to the resin is determined by weight within a range of 30 to 90 percent.

34. Two-color image forming apparatus according to claim 31, wherein said non-magnetic sleeve and permanent magnetic roll are able to perform a relative rotation, a conveying direction of said developing agent is rendered the same as the moving direction of the photosensitive body in the developing area, and the ratio of the conveying speed of said developing agent to the moving speed of the photoconductive body is determined within a range of between 0.5 to 2.0.

35. Two-color image forming apparatus according to any one of the claims 2, 3, 4 or 5, wherein said first developing means has one color toner, said second developing means has another color toner, said one color toner is black toner said another color toner is chromatic color toner.

36. Two-color image forming apparatus according to claim 35, wherein said chromatic color toner is red toner.

37. Two-color image forming apparatus according to any one of the claims 2, 3, 4 or 5, wherein said first electrostatic latent image forming means has A color filter, said second electrostatic latent image forming means has B color filter, said A color filter and said B color filter are complementary to each other.

38. Two-color image forming apparatus according to claim 37, wherein said A color filter is red, said B color filter is cyan.

* * * * *

UNITED STATES PATENT AND TRADEMARK OFFICE
CERTIFICATE OF CORRECTION

PATENT NO. : 4,634,259

DATED : January 06, 1987

INVENTOR(S) : Mitsugu OISHI et al.

It is certified that error appears in the above-identified patent and that said Letters Patent is hereby corrected as shown below:

At column 1, line 24 of the printed patent, change "atmospher" to ---atmosphere---.

At column 5, line 3 of the printed patent, insert ---that--- after "necessary".

At column 7, line 18 of the printed patent, delete "," after "is".

At column 9, line 51 of the printed patent, change "qharge" to ---charge---.

At column 11, line 63 of the printed patent, delete "so".

At column 11, line 63 of the printed patent, insert ---so--- after "ones".

At column 12, line 2 of the printed patent, change "black-correspoding" to ---black-corresponding---.

At column 12, line 21 of the printed patent, delete "made" after "can be".

At column 12, line 24 of the printed patent, delete "is".

At column 13, line 66 of the printed patent, insert ---the--- after "Since".

At column 14, line 42 of the printed patent, insert ---of the--- after "because".

At column 15, line 41 of the printed patent, change "ight" to ---light---.

At column 15, line 44 of the printed patent, insert a circle after "which".

At column 16, line 26 of the printed patent, change "said" to ---the---.

UNITED STATES PATENT AND TRADEMARK OFFICE
CERTIFICATE OF CORRECTION

PATENT NO. : 4,634,259

DATED : January 06, 1987

INVENTOR(S) : Mitsugu OISHI et al.

It is certified that error appears in the above-identified patent and that said Letters Patent is hereby corrected as shown below:

At column 16, line 34 of the printed patent, delete "a" after "as"

Signed and Sealed this

Thirteenth Day of September, 1988

*Attest:*

DONALD J. QUIGG

*Attesting Officer*     *Commissioner of Patents and Trademarks*